United States Patent [19]
Bragg et al.

[11] 3,788,040
[45] Jan. 29, 1974

[54] FUEL TANK INERTING SYSTEM

[75] Inventors: Kenneth R. Bragg, Redondo Beach; Richard L. Kenyon, Los Angeles, both of Calif.

[73] Assignee: Parker-Hannifin Corporation, Cleveland, Ohio

[22] Filed: June 9, 1972

[21] Appl. No.: 261,432

[52] U.S. Cl............ 55/160, 55/170, 55/196, 55/204, 220/88 B, 261/77, 261/121
[51] Int. Cl............................. B01d 19/00
[58] Field of Search..... 55/159, 182, 196, 204, 160; 62/1, 50; 220/88 B; 244/135; 261/77, 121

[56] References Cited
UNITED STATES PATENTS
3,710,549  1/1973  Nichols et al............... 55/160
3,691,730  9/1972  Hickey et al............... 55/166
2,912,830  11/1959  Coldren et al............. 62/50
2,764,873  10/1956  Mooyaart................... 62/1

Primary Examiner—Samih N. Zaharna
Assistant Examiner—Richard W. Burks
Attorney, Agent, or Firm—John N. Wolfram

[57] ABSTRACT

A method of maintaining the ullage of a previously inerted aircraft fuel tank in the inert condition under which combustion cannot take place within the tank during the after filling of the tank with liquid fuel, and during flight of the aircraft. The method utilizes the oxygen lean ullage gases for scrubbing oxygen from incoming fuel during filling of the tank, separating the gases having scrubbed oxygen therein from the incoming fuel and venting the same to the exterior of the tank so as not to raise the oxygen content of the gases remaining in the ullage.

25 Claims, 6 Drawing Figures

PATENTED JAN 29 1974 3,788,040

FUEL TANK INERTING SYSTEM

BACKGROUND OF THE INVENTION

A mixture of air, which contains about 21 percent oxygen, with fuel vapor in the ullage of an aircraft fuel tank can be highly combustible. To render the fuel vapor and air mixture incombustible it has heretofore been proposed to introduce an inert gas, such as nitrogen, into the tank ullage so as to reduce the oxygen content to about 9 percent or less, the exact percentage depending upon the particular conditions of pressure and temperature.

Liquid fuel in an aircraft tank at ground level atmospheric pressure normally contains oxygen and nitrogen dissolved therein in proportion to the ground level partial pressure of these gases in ambient air. As the aircraft ascends, the gases are released from the liquid fuel into the tank ullage as pressure in the tank is decreased in accordance with the decrease in ambient pressure. The concentration of oxygen and nitorgen in the released gas is proportional to the partial pressure of the gases dissolved in the fuel. As gases are released to the ullage from the fuel by reduction of pressure, the ratio of the partial pressures of oxygen to nitrogen increases the oxygen concentration in the emerging gas therefore increases during ascent. At the operating altitude for jet aircraft the oxygen concentration in the released gas can be nearly double the concentration at the start of climb. Thus, even though the oxygen contact of the fuel is 9 percent or less while the aircraft is on the ground, to maintain this percentage at operating altitude it is necessary to either add nitrogen as the aircraft ascends to reduce the oxygen concentration in the fuel to about 5 percent or less while the aircraft is on the ground.

During descent of the aircraft it is necessary to admit gas into the tank for increasing the pressure therein so that the tank does not collapse as ambient pressure increases. To maintain inerted tanks in the inert condition, it has heretofore been proposed to use nitrogen rather than ambient air for thus pressurizing the tank. As a result, when the aircraft lands with its fuel tanks empty, or nearly so, the tanks contain a large amount of nitrogen whereby the oxygen content of the ullage is relatively low, for example, as low as .5 percent.

It is an object of the present invention to utilize such inert ullage gases for scrubbing oxygen from liquid fuel entering the tank during refilling thereof and yet maintain the oxygen content of the fuel to 5 percent or less while the aircraft is on the ground, preferably without introducing additional nitrogen into the tank from a separate supply, although this can be done if desired. By bringing the fuel oxygen concentration down to 5 percent or less when the tank is being filled, it will be unnecessary to add nitrogen to the tank during ascent of the aircraft for diluting oxygen that comes out of solution from the fuel as the tank pressure is decreased during ascent in order to keep it below 9 percent.

If the oxygen which is removed from the fuel during fueling is released into the ullage the ullage becomes contaminated with oxygen. This contamination prevents the fuel from being scrubbed to as low as 5 percent by using only the contaminated ullage gas.

SUMMARY OF THE INVENTION

The present invention maintains a previously inerted fuel tank in the inert condition during and after refueling of the tank and reduces the oxygen concentration in the fuel to approximately 5 percent or less by utilizing inert ullage gases for scrubbing oxygen from the incoming fuel, separating the mixture of ullage gases and scrubbed oxygen from the liquid fuel and venting the same overboard in a manner that prevents the oxygen enriched gases from mixing with the inert gases remaining in the tank ullage.

Figures 1, 2, 3, 4, 5, 6:
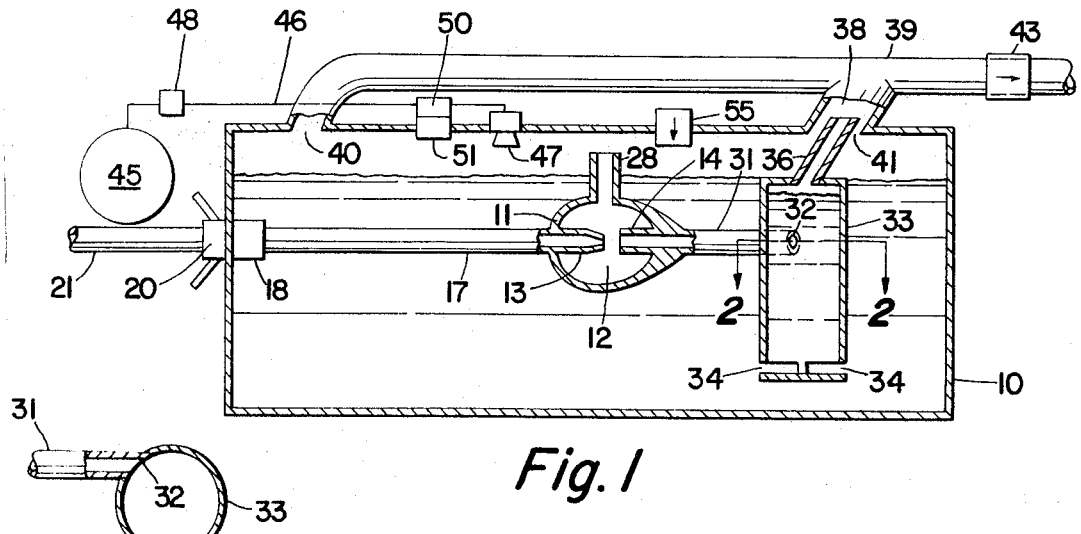
FIG. 1 is a cross section of an aircraft fuel tank fitted with one form of the invention in which the gas-liquid separator has unrestricted communication with the tank vent system.
FIG. 2 is a cross section view along the lines 2—2 of FIG. 1.
FIG. 3 is a fragmentary view showing an alternate form of invention for deep tanks and in which the opening between the separator and vent system may be throttled by a float controlled valve.
FIG. 4 is similar to FIG. 3 but showing a fixed capacity restricted orifice between the separator and vent system.
FIG. 5 is a fragmentary section view of another form of the separator in which the opening into the vent pipe is arranged to prevent loss of liquid fuel through the vent system.
FIG. 6 is a cross section view on the line 6—6 of FIG. 5.

In the system of FIG. 1, aircraft fuel tank 10 has mounted therein an aspirator device 11 having a chamber 12 containing an ejector nozzle 13 axially aligned with and spaced from a receiver 14. Nozzle 13 is connected by an inlet conduit 17 to a filling valve 18 and nozzle 20 is connected to a fuel supply hose 21.

A conduit 28 communicates with chamber 12 and its upper end extends above the normal level to which the tank is to be filled with fuel, whereby the upper end of conduit 28 is constantly open to the ullage.

Receiver 14 is connected to an injector tube 31 that opens tangentially at 32 into a generally cylindrical separator container 33, as indicated in FIG. 2. Separator 33 is open at its bottom to the tank interior via circumferential slots 34 and is closed at its top except for a duct 36 connecting the interior of separator 33 with a tank vent opening 38 that leads to a vent manifold 39 typically having another connection 40 with the tank. Manifold 39 is connected to atmosphere via a relief valve 43 that prevents backflow of air from ambient to tank. The tank ullage is also in open communication with vent opening 38 at 41.

Mounted in the aircraft is a dewar 45 containing liquid nitrogen and connected by a conduit 46 to a nozzle or opening 47 within tank 10. Also connected within conduit 46 is a shut-off valve 50 controlled by a pressure differential device 51 that senses ambient pressure and tank pressure and which responds to a predetermined differential between such pressures to open valve 50 for pressurizing the tank with nitrogen, the liquid nitrogen from dewar 45 being vaporized for this purpose by any suitable means such as vaporizer 48. Device 51 then causes valve 50 to close when the differential between ambient and tank pressure reaches another predetermined amount.

An emergency dive valve 55 connects ambient to the tank when a pressure differential of a still different amount exists between the two due to failure of the tank to be pressurized with nitrogen from dewar 45 as just described.

Operation of FIG. 1 Form

When the aircraft is on the ground with tank 10 empty, or partially so, after a flight in which nitrogen from dewar 45 has been used to pressurize the tank during descent, the tank ullage will contain a mixture of fuel vapor, oxygen and nitrogen. The oxygen content will be substantially below 4.5 percent and may be as low as .5 percent. To refuel the tank, nozzle 20 is attached to valve 18 and is opened to permit flow of liquid fuel into tank 10. The incoming fuel flows through conduit 17 and nozzle 13 to receiver 14 and through ejector conduit 31 into separator 33.

As the fuel passes through aspirator 11, it lowers the pressure therein below that of the tank ullage and consequently ullage gases flow into conduit 28 and aspirator 11 where they mix with the liquid fuel and pass with the fuel through conduit 31 into separator 33. The liquid fuel will have oxygen dissolved therein in accordance with the partial pressure of oxygen corresponding to ground level pressure to which the fuel in the ground storage tank has been subjected. Because the partial pressure of oxygen of the ullage gases brought into aspirator 11 is lower than that of the oxygen dissolved in the liquid fuel, oxygen from the fuel will diffuse into the ullage gases as the fuel and gases pass through aspirator 11 and conduit 31 in intimate contact, thereby reducing the amount of oxygen remaining in the fuel.

When the mixture of liquid fuel and oxygen enriched ullage gases in conduit 31 discharge tangentially into separator 33, the oxygen enriched gases will separate from the liquid fuel and rise within the separator to duct 36 from which they will discharge into vent opening 38 and conduit 39 to be vented to ambient through relief valve 43. Meanwhile, liquid fuel in separator 33 will discharge through its bottom openings 34 into tank 10. The mixture of gases remaining in the fuel as it passes from separator 33 into the tank will include 5 percent oxygen or less.

The aspirator is so designed that in a given time interval the volume of ullage gases drawn into aspirator 11 for discharge from the separator is somewhat less than the volume of fuel being delivered to the tank. Hence, a volume of ullage gases substantially equal to the difference between such volumes will pass through vent openings 40, 41 for discharge to ambient. This causes a slight rise in ullage pressure over that in the vent system whereby oxygen contaminated gases discharging from separator vent 36 will directly enter vent opening 38 and will not enter the tank ullage in any significant amount. Thus contamination of the tank ullage with oxygen enriched gases is avoided. When the fuel level in separator 33 rises above opening 32 a back pressure in ejector 31 will be created that will somewhat reduce the suction in chamber 12 and hence the efficiency of the scrubbing action but this can be tolerated.

When tank 10 is filled with liquid fuel to the desired level, nozzle 20 is closed either manually or automatically and disconnected from the tank. The aircraft is then ready for flight with the oxygen content of the tank ullage and of the gases dissolved in the liquid fuel being 5 percent or less.

As ambient pressure decreases during ascent of the aircraft, valve 43 will open as required to vent ullage gases to atmopshere for maintaining tank pressure at a predetermined relationship with respect to ambient, as for example, .7 psi above ambient. As the absolute pressure in the tank is lowered, the partial pressure of oxygen in the ullage also drops. Oxygen still in solution in the fuel comes out and enters the ullage until an equilibrium in the two oxygen pressures is again established. This raises the oxygen content of the ullage but with the system properly designed the ullage oxygen content will not exceed about 9 percent under normal conditions, which allows for a safety factor below the percentage at which explosion may occur.

As the aircraft consumes fuel at cruising altitude, and also when the aircraft descends, the tank pressure decreases relative to ambient. When the differential between the two reaches a predetermined amount, as for example, when tank pressure is .2 psi above ambient, pressure differential device 51 opens valve 50 to admit pure nitrogen into the tank via nozzle 47 to raise the tank pressure to about .5 psi over ambient, at which time device 51 permits valve 50 to close. Thus, at the end of the flight and with tank 10 empty of liquid fuel, or nearly so the tank ullage will contain a mixture of fuel vapor, oxygen and nitrogen at slightly higher than ground level atmospheric pressure and with the oxygen content being as low as .5%. The tank is now again ready for refueling in the manner described above.

FIG. 3 Form

FIG. 3 shows an arrangement that is especially useful in connection with tanks having considerable vertical height. In such cases it is desirable to discharge the fuel from the separator near the bottom of the tank to minimize creation of electrostatic charges and yet have the separator of relatively short height to minimize its size. In this instance, the top of the separator is considerably below the fill level 66 of the tank 10 and a normally open valve 60 is operated by a float 61 for closing off duct 36, except for a small orifice 62, when the fuel head 65 in the separator nears opening 32.

During the first part of a filling operation, the hydrostatic head 65 within separator 33 will be slightly higher than the liquid level 66 in the tank due to the pressure drop through the separator fuel outlets 34, but it will be below opening 32 so that the efficiency of the scrubbing operation will be substantially unimpaired at this time.

When the fuel level 65 in the separator nears opening 32 float 61 will cause valve 60 to close duct 36 except for orifice 62. This builds up pressure of gas in the upper part of the separator to keep fuel level 65 below opening 32 as tank 10 continues to be filled to the level indicated at 66. During this time the increased pressure within the separator will raise the back pressure in conduit 31 to decrease the effectiveness of aspirator 12, but this is acceptable.

FIG. 4 Form

FIG. 4 is a variation of FIG. 3 in that a fixed orifice 64 in duct 36 is provided in lieu of the float operated valve element 60. Orifice 64 restricts passage of gases therethrough to the extent that pressure will be developed in the separator to keep the fuel head 65 within separator 33 sufficiently below the tank fuel head 66 so that it will not cover opening 32 before the tank is full, whereby flooding of separator 33 is avoided. At the same time, the gas pressure in separator 33 imposes some back pressure in conduit 31 but not enough to seriously impair operation of aspirator 11 and the scrubbing of oxygen from the fuel.

FIG. 5 Form

FIG. 5 is a variation of FIG. 4 in that duct 36 is extended below opening 32. Duct 36 has a closed bottom 70 and has circumferentially arranged axial slots 71 adjacent the closed bottom. One side 72 of the slots is shaped as a scoop facing away from the direction of rotation of the fuel, which is illustrated by arrow 73 in FIG. 6 for minimizing or preventing entrance of liquid fuel into duct 36 while the level 65 of liquid fuel in the separator is either below or partially covers slots 71.

When fuel level 66 in the tank is low, level 65 of fuel in separator 33 will be below the lower end of duct 36 and gas flow through slots 71 and duct 36 to manifold is unobstructed. As level 65 rises it partially submerges slots 71 and reduces the effective gas flow area thereof. This increases the back pressure in separator 33 which prevents level 65 from flooding separator 33 as level 66 continues to rise.

Also, as shown in FIG. 5, opening 32 may be rectangular for injection of the fuel into the separator with subsequent more effective separation of the gases from the liquid. Such rectangular opening 32 may be utilized with all forms of the invention.

We claim:

1. An inerting system comprising a fuel tank having space for containing a body of liquid fuel and having gases in the ullage that include an inert gas in an amount sufficient to prevent combustion of fuel vapor in the tank ullage, means for introducing liquid fuel into the tank and which fuel may contain oxygen at a higher partial pressure than the partial pressure of oxygen that may be in the ullage, means for mixing said ullage gases with incoming fuel whereby oxygen gas in the fuel is removed therefrom and combined with said mixing ullage gases, means for separating said combined gases from the incoming fuel prior to discharge of the incoming fuel into said space, and means for venting the separated gases from the tank.

2. The system of claim 1 in which the introducing means includes a filling conduit, and said mixing means includes an aspirator that connects the ullage to the filling conduit.

3. The system of claim 1 in which the separator is a container open at its top to said vent means and open at its bottom to said tank.

4. The system of claim 1 in which said mixing means and said separator means are within said tank.

5. The system of claim 1 in which said separator means includes a duct at its upper end directed toward said vent means.

6. The system of claim 1 in which there is a restricted orifice between the separator means and vent means through which said separated gases flow.

7. The system of claim 1 in which there is a separate supply of inert fluid, and there is a means for automatically injecting said fluid into the tank when the tank pressure bears a predetermined relation to ambient pressure.

8. The system of claim 3 in which there is a means for venting the tank ullage to the exterior of the tank.

9. The system of claim 3 in which the top of the separator is also open to the tank ullage.

10. The system of claim 3 in which said introducing means connects with said separator intermediate said top and bottom openings.

11. The system of claim 3 in which the container has a cylindrical portion and said mixing means includes a conduit having a rectanglular outlet that opens tangentially into said cylindrical portion.

12. The system of claim 6 in which there is an unrestricted opening between the separator and the vent means when the tank is substantially empty of liquid fuel, and means for at least partially closing said opening prior to the complete filling of the tank with liquid fuel.

13. The system of claim 12 in which said closing means includes a float operated valve.

14. The system of claim 5 in which said restricted orifice comprises the sole connection between the separator and vent means.

15. The system of claim 1 in which the separator means includes a container, a duct in said container connected to the vent means, means to circulate the incoming fuel having the combined gases therein in said container about said conduit, and circumferentially spaced openings in said conduit communicating with said container for receiving said combined gases into said conduit.

16. The system of claim 15 in which there are scoops projecting from said duct forming one side of said openings.

17. The system of claim 15 in which the circulating means causes the incoming fuel and combined gases therein to rotate in one direction about said container and there are scoops projecting from said duct to form one side of said openings, said scoops facing in said direction of rotation.

18. The system of claim 17 in which said openings are near a closed end of said duct and said incoming fuel with the combined gases therein enters the container above said openings.

19. An inerting system comprising a fuel tank having gases in the tank ullage that include a sufficient amount of inert gas to prevent combustion of fuel vapor in the tank ullage, a vent means for the tank, a conduit for introducing liquid fuel into the tank, said conduit including an aspirator and an injector tube, a gas-liquid separator comprising a container having one opening connected to the vent means and another opening connected with the tank interior, said injector tube connecting the aspirator to the separator, and means connecting the ullage to the aspirator whereby incoming liquid fuel containing oxygen dissolved therein at a partial pressure greater than the partial pressure of oxygen contained in the ullage gases and flowing through said conduit draws ullage gases through said connecting means to said aspirator and injector tube whereby the ullage gases mix with the liquid fuel therein and scrub oxygen from the latter, said scrubbed fuel and the mixed ullage gases with scrubbed oxygen therein entering the separator from the injector tube and being separated thereby, means for discharging the scrubbed liquid fuel from the separator to the tank, and means for directing the gases in the separator to said vent means.

20. The system of claim 19 in which said injector tube communicates with the separator intermediate the fuel discharge means and the vent means.

21. The system of claim 20 in which there is a means to prevent liquid in the separator from rising to a higher level than the connection of the injector tube to the separator when liquid level in the tank is above said connection.

22. The system of claim 19 in which there is a means for maintaining the ullage pressure higher than the pressure in the vent means.

23. The system of claim 21 in which said last mentioned means comprises a float operated valve that at least partially closed said directing means except for a restricted connection between said directing means and said separator.

24. The system of claim 23 in which said last mentioned means comprises a restricted orifice between said directing means and said separator.

25. The system of claim 21 in which said last mentioned means comprises openings in a discharge conduit which openings become partially obstructed with fuel as the fuel level rises above a predetermined location.

* * * * *